United States Patent [19]

Chern

[11] Patent Number: 5,339,031
[45] Date of Patent: * Aug. 16, 1994

[54] METHOD AND APPARATUS FOR NON-CONTACT HOLE ECCENTRICITY AND DIAMETER MEASUREMENT

[75] Inventor: Engmin J. Chern, Columbia, Md.

[73] Assignee: The United States of America as represented by the Administrator, National Aeronautics & Space Administration, Washington, D.C.

[*] Notice: The portion of the term of this patent subsequent to May 25, 2010 has been disclaimed.

[21] Appl. No.: 904,620

[22] Filed: Jun. 26, 1992

[51] Int. Cl.$^5$ .............. G01B 7/28; G01B 5/20; G01N 27/72; G01N 27/90
[52] U.S. Cl. .............. 324/219; 324/207.16; 324/262; 33/543
[58] Field of Search .............. 324/219–221, 324/207.16–207.19, 262; 33/542–544, 501.6

[56] References Cited

U.S. PATENT DOCUMENTS

| | | |
|---|---|---|
| 3,740,643 | 6/1973 | Lady, Sr. et al. |
| 4,546,314 | 10/1985 | Minerbo et al. |
| 4,546,315 | 10/1985 | Minerbo et al. .............. 324/221 |
| 4,596,952 | 6/1986 | Goff et al. .............. 324/219 |
| 4,659,988 | 4/1987 | Goff et al. .............. 324/219 |
| 4,965,518 | 10/1990 | Agarwala. |
| 5,059,904 | 10/1991 | Mazzone et al. |
| 5,083,084 | 1/1992 | Bauer et al. |
| 5,111,142 | 5/1992 | Mazzone et al. .............. 324/219 X |
| 5,115,196 | 5/1992 | Low et al. .............. 324/220 |
| 5,214,379 | 5/1993 | Chern .............. 324/220 |

OTHER PUBLICATIONS

NORTEC PS-4—Programmable Eddy Current Scanner, Staveley Instruments, Inc. (Fact Sheets—2 pages) No Month, 1987.
NDT-25L—Programmable Lab Eddyscope—Pushbutton Eddy Current Tester, NDT Technologies Inc. (Fact Sheets—4 pages) No Month, 1981.

*Primary Examiner*—Gerard R. Strecker
*Assistant Examiner*—Warren S. Edmonds
*Attorney, Agent, or Firm*—Robert D. Marchant; Guy M. Miller

[57] ABSTRACT

A method and apparatus for inserting an eddy current hole probe into a hole specimen and automatically moving the probe in two orthogonal (X, Y) directions in response to the impedance change of an eddy current coil located in the probe as a function of distance from the surface of the hole. The probe is centered in the hole by a system controller which operates to minimize the composite deviation value of the coil impedance. The diameter of the hole is then determined from the average impedance measurement. Following this, a plot of the hole eccentricity is generated by determining the impedance deviation from the average coil impedance value as a function of the angular rotation of the probe in the hole. Measurements of the hole eccentricity for a plurality of hole depths provides an indication of the hole eccentricity profile.

20 Claims, 3 Drawing Sheets

METHOD AND APPARATUS FOR NON-CONTACT HOLE ECCENTRICITY AND DIAMETER MEASUREMENT

ORIGIN OF THE INVENTION

The invention described herein was made by an employee of the United States government, and may be manufactured and used by or for the Government for governmental purposes without the payment of any royalties thereon or therefor.

BACKGROUND OF THE INVENTION

This invention relates generally to eddy current testing methods and apparatus, and more particularly to an eddy current type of method and apparatus for measuring hole diameter and determining the eccentricity of the hole.

Hole inspection systems utilizing such devices as dowel pins and hole gauges, are generally known. Also known are capacitance type hole probe systems as well as systems using eddy current probes including surface probes and hole probes. A hole probe utilized in an eddy current inspection system is relatively close to the same diameter as the hole being inspected, but must be small enough to fit into the hole without making any contact therewith.

In an eddy current probe, eddy currents are produced in an electrically conductive test piece by a coil through which an alternating current flows, and as a result of the eddy currents produced, impedance of the coil and the voltage applied to the coil are changed and thus measurement of a particular characteristic of the hole is determined by a measured change in the impedance of the sensor coil.

SUMMARY

It is therefore a primary object of the present invention to provide an improvement in eddy current testing methods and apparatus.

It is a further object of the invention to provide an improved eddy current method and apparatus for measuring hole eccentricity and diameter of a specimen under test.

It is another object of the invention to provide an improvement in eddy current testing methods and apparatus for making repeated hole eccentricity and diameter measurements accurately and reliably without operator intervention.

Briefly, the foregoing and other objects are achieved by inserting an eddy current hole probe into a hole specimen and automatically moving the probe in two orthogonal (X, Y) directions in response to the impedance change of an eddy current coil located in the probe as a function of distance from the surface of the hole. The probe is centered in the hole by a system controller which operates to minimize the variation of the coil impedance around the hole. The diameter of the hole is then determined from an average impedance measurement. Following this, a plot of the hole eccentricity is generated by determining the impedance deviation from the average coil impedance value as a function of the angular rotation of the probe in the hole. Repeating measurements of the hole eccentricity for a plurality of hole depths and generating a visual display of the hole eccentricities as a function of depth provides an indication of the overall hole eccentricity.

BRIEF DESCRIPTION OF THE DRAWINGS

The following detailed description will be more readily understood when considered together with the accompanying drawings wherein.

DETAILED DESCRIPTION OF THE INVENTION

Figure 1:
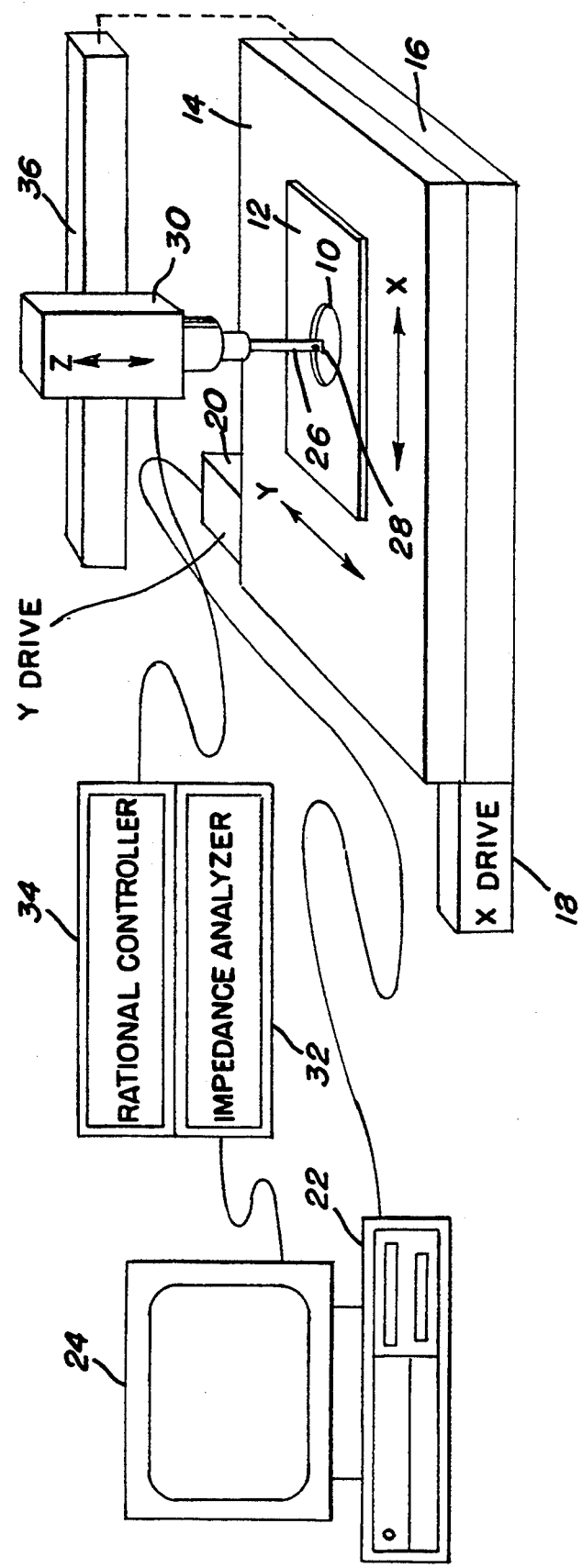
FIG. 1 is an electrical-mechanical block diagram of a preferred embodiment of an apparatus for implementing the subject invention.

Referring now to the drawings and more particularly to FIG. 1, shown thereat is a physical layout of a liftoff eddy current testing system for performing non-contact hole eccentricity and diameter measurements of a hole 10 located, for example, in a specimen 12. The specimen 12 is positioned on a platform 14 mounted on a stationary base 16. The platform 14 is movable in two orthogonal (X,Y) axis directions in response to electrical signals applied to X and Y axis drives 18 and 20. The X and Y axis drives 18 and 20 are controllable by digital computer apparatus 22, having a video display unit 24 associated therewith, and is used for mechanical control, data acquisition, processing and analysis.

Figure 4:
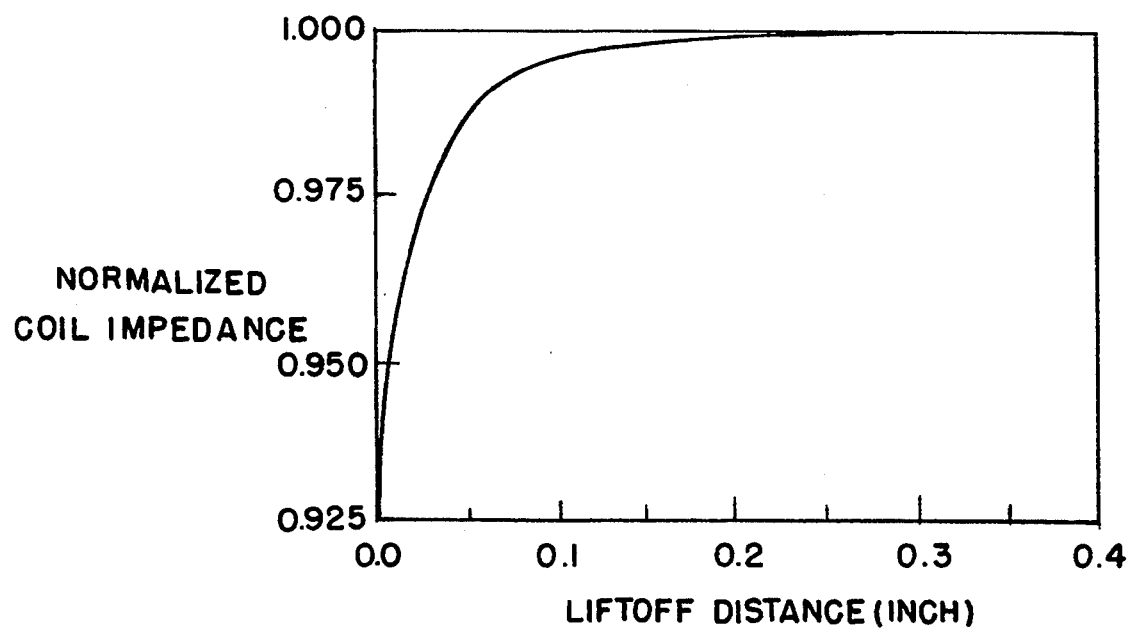
FIG. 4 is a characteristic curve illustrating the relationship between liftoff distance and coil impedance of a hole probe used in the embodiment of the invention shown in FIG. 1.

An eddy current probe 26 which operates on the eddy current liftoff principle, i.e. change in the impedance of a sensor coil 28 as a function of distance away from an electrically conductive surface, a typical characteristic curve of which is illustrated in FIG. 4, is fitted to a rotational eddy current probe scanner 30. As shown in FIG. 4, coil impedance changes dramatically for a lift-off distance of 0.1 in. or less.

The sensor coil 28 is coupled back to an instrumentation sub-system including an impedance analyzer 32, and a rotational controller 34. The eddy current probe scanner 30 includes means for not only rotating the probe 26, but also varying its position along a third orthogonal (Z) axis which corresponds to depth within the specimen hole 10. For purposes of illustration, the scanner device 30 is shown in FIG. 1 mounted on a support member 36 physically attached to the base member 16.

Figure 2:
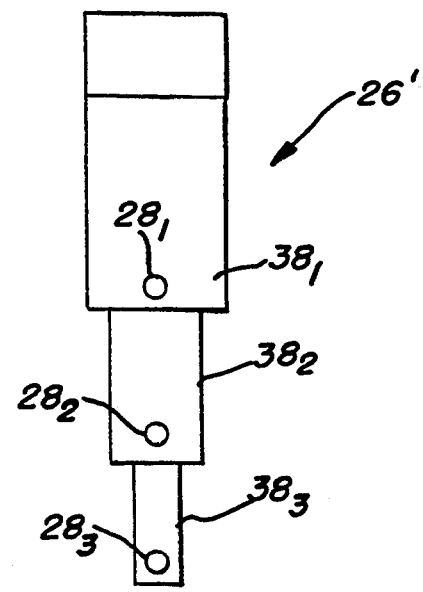
FIG. 2 is a side elevational view of a three coil hole probe utilized which can be used in the embodiment shown in FIG. 1.
Figure 3:
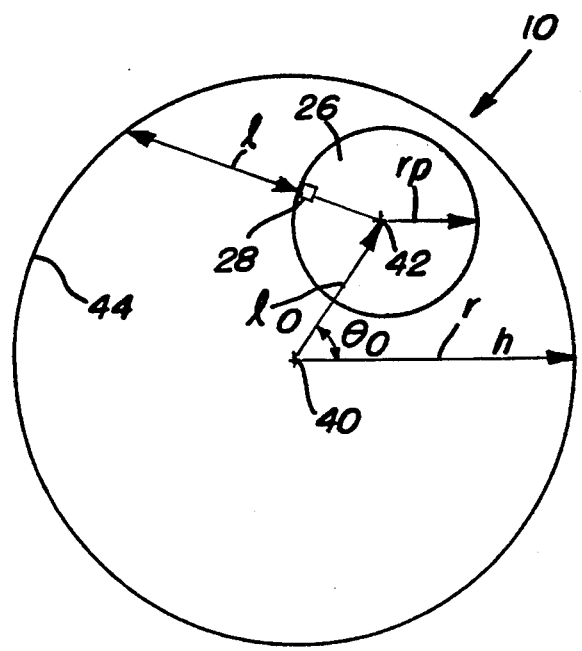
FIG. 3 is a diagram helpful in understanding the operation of the invention.

Referring now to FIGS. 2 and 3, FIG. 2 is illustrative of a multi-section hole probe 26' which includes three sensor coils $28_1$, $28_2$ and $28_3$ which are located on three probe sections $38_1$, $38_2$ and $38_3$ of mutually different sizes, becoming smaller towards the outer end. The probe sections permit three different hole size range measurements to be made without changing probes 26 for the particular range of hole sizes being examined.

In order to understand the operation of the equipment shown in FIG. 1, and the method by which measurements are made of hole diameter and eccentricity, reference is now made to FIG. 3 which depicts the relationship between the eddy current probe 26 including its sensor coil 28 and a hole 10 under test. As shown, the probe 26, having a diameter of $r_p$, is located off center of the hole 10 of radius $r_h$ by the polar coordinates $l_0$ and $\theta_0$ between centers 40 and 42. The eddy current liftoff principle is utilized for measurement of hole eccentricity and diameter and comprises detecting the change of impedance Z of the sensor coil 28 as a function of distance from the surface 44 of the hole 10 in the radial direction.

The liftoff distance l can be expressed by the following relationship:

$$l = -r_p - l_0 \cos(\theta - \theta_0) + [r_h^2 - l_0^2 \sin^2(\theta - \theta_0)]^{\frac{1}{2}} \quad (1)$$

The purpose of the invention is, (a) to measure the diameter of the hole and (b) determine a measure of its eccentricity or out of roundness at a predetermined depth. These parameters are determined in terms of the coil impedance Z which can be expressed as:

$$Z = 1/I^2 \int \int_s (E \times H) ds \quad (2)$$

where I is the current in the probe coil 28, E is the electric field induced by the coil 28, H is the magnetic field induced by the coil 28, and s is the area enclosed by E and H.

The coil impedance Z which includes two components, resistance R and inductive reactance XL, is a function of liftoff distance l and which can be expressed as follows:

$$Z = R + j X_L = Z(l) \quad (3)$$

In order to center the probe 26 at the point 40 shown in FIG. 3, the task becomes one of minimizing the length $l_0$ which can be expressed as:

$$l_0 = |l_0| \cos\theta_0 \hat{x} + |l_0| \sin\theta_0 \hat{y} \quad (4)$$

where x and y are unit vectors along the X and Y axis. This is accomplished by minimizing the composite deviation $\sigma$ which is the root mean square value of the difference between the scaler values $|Z|$ of coil impedance and the value of the average impedance $\overline{Z}$ for a plurality (n) of points around the inside surface 44 of the hole 10 and which can be expressed as:

$$\Sigma = \{[\Sigma(|Z| - \overline{Z})^2]/n\}^{\frac{1}{2}} \quad (5)$$

The average impedance $\overline{Z}$ can be expressed as:

$$\overline{Z} = \Sigma |Z|/n \quad (6)$$

and is proportional to hole diameter $(l + r_p)$.

In operation, a specimen 12 with a hole 10 to be tested is mounted on the table 14 and the probe 26 is lowered to a predetermined depth therein either manually or automatically by the probe scanner assembly 30 under the control of the computer 22 which is coupled thereto through the impedance analyzer 32 and the rotational controller 34. The impedance Z of the sensor coil 28 is first calibrated for an absolute liftoff distance l. Following this, the eddy current probe is rotated in the hole 10 at a predetermined speed, typically 6 rpm or less. The impedance Z at a predetermined number(n) of angular positions is determined by the impedance analyzer 32 and is fed to the computer 22 through a computer interface for integration and computation. The computer next generates signals which are coupled to the X and Y axis drives 18 and 20 for centering the probe 26. This is accomplished by first calculating the average impedance $\overline{Z}$ and then adjusting the X and Y axis positions of the probe 26 until the value of the composite deviation $\sigma$ as stated in equation (5) is a minimum. Each composite deviation computation requires a measured set of deviation values comprising the difference between $|Z|$ and $\overline{Z}$ for a predetermined number (n) points around the periphery of the hole 10. Once centering of the probe has been accomplished, the eccentricity of the hole at a particular depth is determined from a new set of deviation values.

Figure 5:
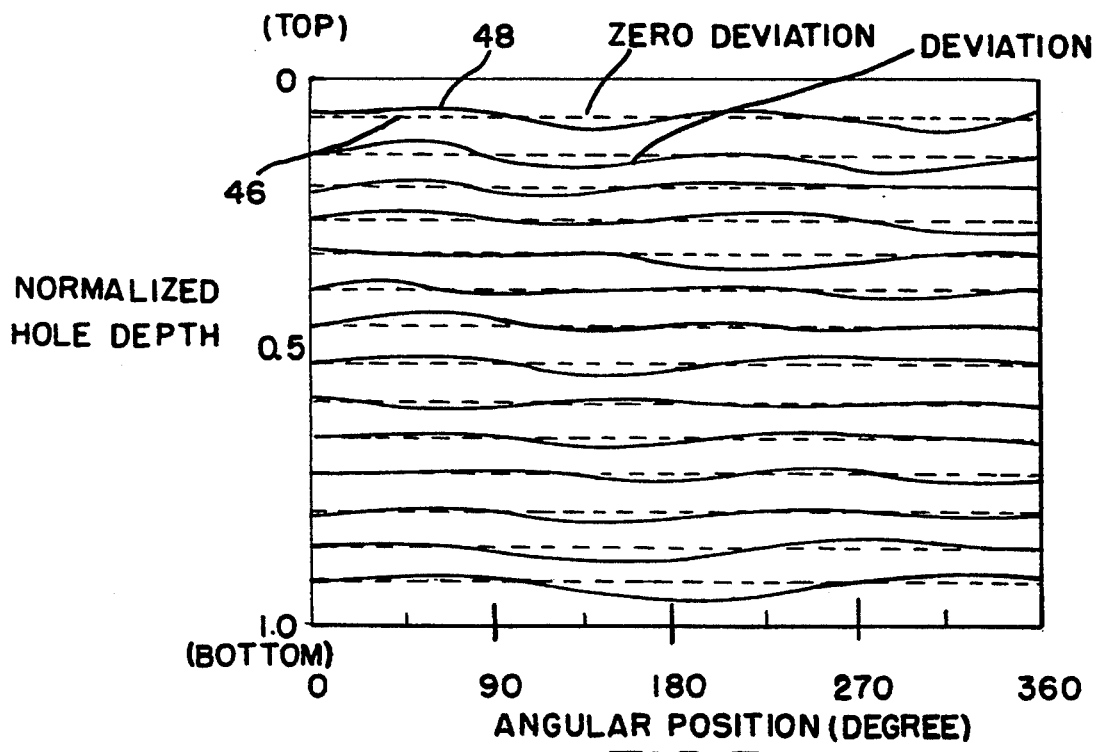
FIG. 5 is a series of characteristic curves illustrating hole eccentricity in a specimen hole as a function of depth.

As shown in FIG. 5, the eccentricity can be plotted and/or displayed for one or more probe depths where, for example, straight dashed-line 46 indicates zero deviation from average impedance $\overline{Z}$ for a particular hole depth, while the curved solid line 48 indicates the actual deviation around the inside surface of the hole 10. In FIG. 5, measurement is taken for a plurality of depths between the top and bottom of the hole 10 and is displayed to provide an eccentricity profile of the hole 10; however, it should be noted that when desired, the eccentricity for a single depth can be generated and displayed.

Thus what has been shown and described is a non-contact hole eccentricity and diameter measurement system which can be fully automated so that accuracy, reliability and repeatability are assured.

Having thus shown and described what is at present considered to be the preferred method and embodiment of the invention, it should be known that the same has been made by way of illustration and not limitation. Accordingly, all modifications, alterations and changes coming within the spirit and scope of the invention as set forth in the appended claims are meant to be included.

I claim:

1. A method of eddy current testing for measuring the diameter and eccentricity of a hole in a specimen under test, comprising the steps of:
   (a) mounting the specimen on a translatable support platform whose motion is controlled by a system controller;
   (b) inserting an eddy current hole probe including a sensor coil into the hole at a predetermined depth;
   (c) axially rotating the probe in the hole and determining a plurality of sensor coil impedance values as a function of rotational angle of the probe in the hole;
   (d) determining an average value of said impedance values, said average value thereby being proportional to the diameter of the hole;
   (e) determining at least one set of deviation values comprising the difference values between said plurality of impedance values and said average value;
   (f) determining a composite deviation value from said difference values;
   (g) translating the platform by said system controller in response to a signal corresponding to said composite deviation value, and iteratively repeating steps (e)–(g) until said composite deviation value comprises a minimum value thereby centering the probe;
   (h) determining at least one other set of deviation values for providing a measure of the eccentricity of the hole following the centering of the probe;
   (i) selectively providing an indication from said system controller of the measure of said diameter and said eccentricity.

2. The method of claim 1 wherein said step (f) of determining said composite deviation comprises determining the root mean square value of said difference values.

3. The method of claim 2 wherein said average impedance value comprises the sum of the scaler values of said impedance values for said plurality of points divided by the number of said plurality of points.

4. The method of claim 1 wherein said step (i) of providing an indication comprises generating a visual display of at least the eccentricity of the hole at said predetermined depth.

5. The method of claim 4 wherein said step (b) of inserting comprises inserting the eddy current hole probe into the hole at a plurality of predetermined depths and repeating steps (h)-(i) to provide a visual display of the eccentricity profile of the hole in the specimen under test.

6. The method of claim 1 wherein said step (g) of centering includes translating the platform in two mutually orthogonal directions.

7. The method of claim 1 wherein said system controller comprises a digital computer.

8. The method of claim 7 wherein said steps (b)-(i) are performed automatically under the control of said digital computer.

9. A system for measuring a parameter of a hole in a specimen under test, comprising:
   (a) platform means for supporting said specimen;
   (b) means for translating said platform means;
   (c) an eddy current hole probe including a sensor coil for insertion into the hole;
   (d) probe holder means for axially rotating the probe and positioning the sensor coil at a predetermined depth in the hole;
   (e) control means for automatically controlling the measurement of at least the diameter of the hole at a predetermined depth and including means for generating a control signal coupled to said means (b) for centering the probe in said hole and further including means for generating a signal of the average impedance value of the sensor coil as the probe is rotated in the hole for providing a measurement of the parameter of the diameter of the hole; and
   (f) means for providing an indication of the diameter measurement.

10. The system of claim 9 wherein said control means (e) further includes,
   (g) means for determining the average impedance value for a plurality of points on an inner side wall surface of the hole at said predetermined depth and generating an output signal corresponding to the difference between said average impedance value and the absolute value of the impedance of the sensor coil at said plurality of points for providing a measurement of the parameter of the eccentricity of the hole at said predetermined depth.

11. The system of claim 10 wherein said means (f) provides an indication of the eccentricity of the hole.

12. The system of claim 11 wherein said means (f) comprises visual display means.

13. The system of claim 12 wherein said visual display means comprises video display means.

14. The system of claim 11 wherein said control means (e) controls said probe holder means (d) to position the sensor coil at a plurality of predetermined depths to measure eccentricity at said plurality of depths and said visual display means generates a display of the eccentricity profile of said hole.

15. The system of claim 9 wherein said means (b) includes means for translating said platform means in two mutually orthogonal directions.

16. The system of claim 9 wherein said control means (e) includes a digital computer.

17. The system of claim 9 wherein said control means (e) includes an impedance analyzer.

18. The system of claim 9 wherein said control means (e) includes rotational controller means coupled to said eddy current probe.

19. The system of claim 9 wherein said hole probe comprises a probe having a plurality of axially aligned probe sections of varying cross sectional diameter, each probe section further including a respective sensor coil.

20. The system of claim 19 wherein said cross sectional diameters decrease from back to front of the probe for permitting different hole size measurements in a plurality of range sizes to be made without changing said probe.

* * * * *